United States Patent [19]

Kretschmer et al.

[11] Patent Number: 6,102,804

[45] Date of Patent: Aug. 15, 2000

[54] LUBRICATING DEVICE FOR LUBRICATING THE PROFILED TUBES OF A TELESCOPIC SHAFT

[75] Inventors: Horst Kretschmer, Köln; Hans Jürgen Langen, Frechen, both of Germany

[73] Assignee: GKN Walterscheid GmbH, Lohmar, Germany

[21] Appl. No.: 09/021,920

[22] Filed: Feb. 11, 1998

[30] Foreign Application Priority Data

Mar. 22, 1997 [DE] Germany .......................... 197 12 158

[51] Int. Cl.[7] .................................. F16C 1/24; F16C 3/03
[52] U.S. Cl. ........................... 464/7; 464/162; 403/109.1
[58] Field of Search ..................................... 464/7, 11, 12, 464/13, 14, 172, 177, 905, 162, 170, 182, 901; 184/105.1, 105.2; 403/40, 23, 109, 359

[56] References Cited

U.S. PATENT DOCUMENTS

| 2,003,508 | 6/1935 | Jencick | 464/11 |
| 2,859,598 | 11/1958 | Hochreuter | 464/7 |
| 3,105,370 | 10/1963 | Weasler | 464/7 |
| 4,308,729 | 1/1982 | Codon | 464/16 |
| 4,595,383 | 6/1986 | Nienhaus | 464/182 |
| 4,945,745 | 8/1990 | Bathory et al. | 464/162 |
| 5,366,043 | 11/1994 | Kretschmer et al. | 464/162 |
| 5,950,764 | 9/1999 | Helbig | 184/105.1 |

*Primary Examiner*—Lynne H. Browne
*Assistant Examiner*—Kenneth Thompson
*Attorney, Agent, or Firm*—Harness, Dickey & Pierce, P.L.C.

[57] ABSTRACT

A lubricating device (13) for a telescopic shaft has a lubricating element and a reservoir. The lubricating device (13) is inserted into a cavity (18) of the inner profiled tube (7). The lubricating device (13) serves to lubricate the surface portions of the outer and inner profiled tubes (6, 7), which slide on one another. Thus, it is possible to achieve permanent lubrication.

7 Claims, 4 Drawing Sheets

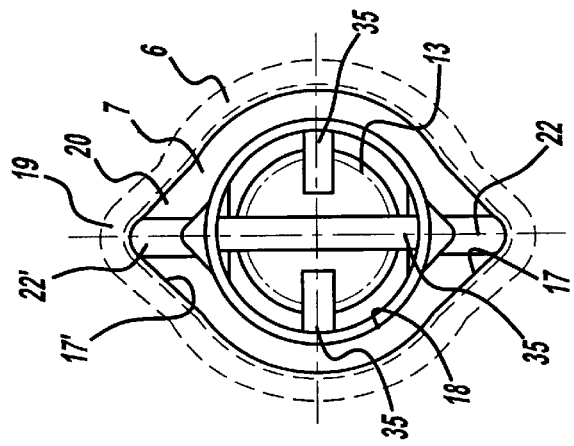
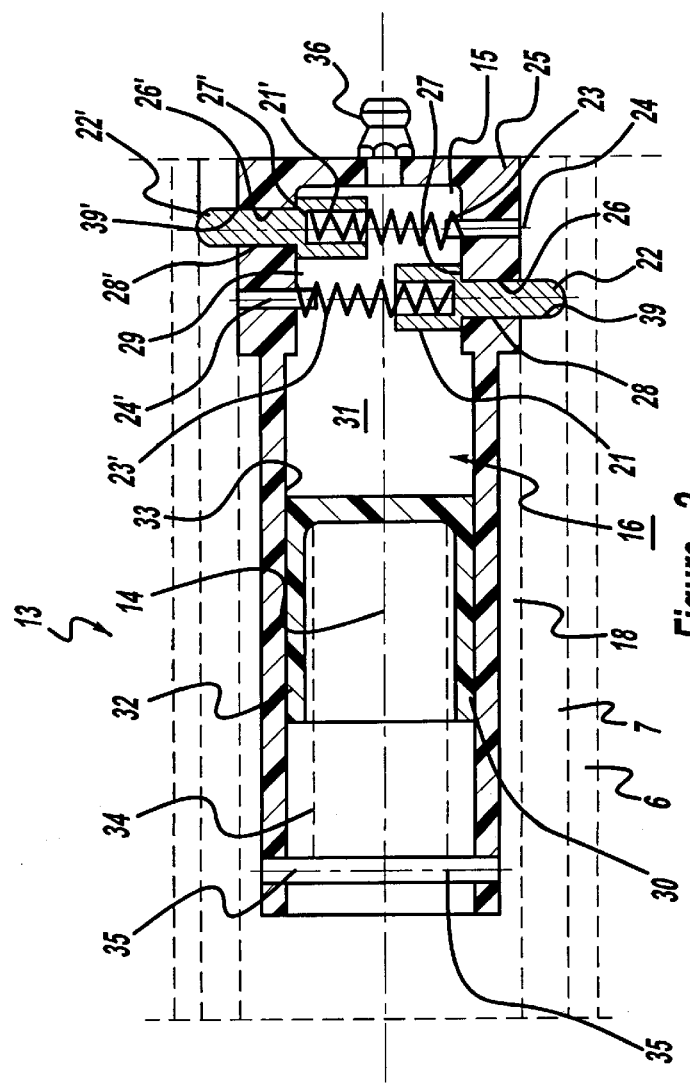

LUBRICATING DEVICE FOR LUBRICATING THE PROFILED TUBES OF A TELESCOPIC SHAFT

BACKGROUND OF THE INVENTION

The invention relates to a lubricating device for lubricating at least one sliding face portion of a telescopic shaft. The telescopic shaft has two profiled tubes which are inserted into one another. The tubes transmit torque and are displaceable relative to one another along a longitudinal axis. An inner profiled tube is positioned inside an outer profiled tube. A lubricating element is associated with the inner profiled tube. The lubricating element passes lubricant to the sliding face portion of the tubes to be lubricated. The invention also relates to a telescopic shaft having such a lubricating device.

A lubricating device is described in DE 42 37 176 CL published Jun. 1, 1994. The lubricating device has a first formed piece inserted into the end of an inner profiled tube. The inserted end is remote from the joint yoke of a driveshaft provided with universal joints. The two ends of the formed piece extend substantially transversely to the longitudinal axis of the profiled tube. The ends are arranged in radially extending bores of the inner profiled tube. The first formed piece has a through-bore which is open towards the above-mentioned bores in the inner profiled tube. The bores in the inner profiled tube are positioned opposite the carrying surface portions of the outer profiled tube. Thus, the carrying surface portions of the inner and outer profiled tubes, which slide on one another and participate in the transmission of torque are, from time to time, supplied with lubricant during the lubricating process. A second profiled piece is inserted into the profiled tube end facing the yoke. An associated lubricating nipple and a hose connect to the second profiled piece to lubricate the tubes. Lubrication is effected periodically by the user. The disadvantage of this system is that re-lubrication can be forgotten or that the quantity of lubricant applied is larger than required for the prevailing conditions.

DE-PS 918 007, published Aug. 5, 1954, describes a lubrication circulation system for propeller shafts of motor vehicles. A filling chamber and a buffer chamber are connected to one another by a return valve. Thus, during operation, oil may move from the filling chamber through splines into the buffer chamber. In turn, the oil may move from the buffer chamber through the return valve, into the filling chamber. The movement of the oil is said to be favorably affected by the normally inclined position of the propeller shaft in the motor vehicle.

DE-GM 19 92 804, published Aug. 29, 1968, describes an automaticlubricating device for propeller shafts. A volume of lubricant is stored between the end of a toothed journal positioned in a toothed sleeve and a cover arranged in the sleeve. The volume of lubricant can be topped up with lubricant by means of a lubricating nipple arranged in the sliding sleeve. A bore is centered on the longitudinal axis of the sliding journal from the end face of the sliding journal pointing towards the chamber. The bore communicates with bores extending radially from the longitudinal axis and ending in the outer face of the sliding journal. In the course of the resulting pumping movement, when the chamber receiving the lubricant is reduced in size, the lubricant moves through the bores into the region between the toothings of the sliding sleeve and sliding journal for the purpose of lubricating same.

The disadvantage of the above embodiments where lubrication is effected through reducing the size of the lubricant storage chamber between the parts participating in the sliding movement, the sliding journal and the sliding sleeve, is that the pumping movement builds up an increased pressure which increases the load on the bearings of the joints. These lubricating devices are not suitable for use in driveshafts for agricultural machinery. This machinery is subject to long stoppage or down times due to the seasonal use of the implements. Furthermore, larger clearances are provided between the sliding profiles in agricultural equipment than in the case of propeller shafts used for driving motor vehicles or used for other engineering purposes.

SUMMARY OF THE INVENTION

It is therefore an object of the invention to provide a lubricating device for a telescopic shaft with two profiled tubes. The tubes are inserted into one another and are displaceable relative to one another along a longitudinal axis. The lubricating device ensures lubrication over a long period of time.

The objective is achieved by a lubricating element which includes a housing and at least one lubricating valve. The valve has a tappet which can be made to contact a sliding face portion of the outer profiled tube. The tappet also projects out of the housing through a valve bore. A valve body is associated with the tappet. The valve body sealingly contacts a seat of the housing. The lubricating element also includes a guiding channel through which lubricant can be taken to the sliding face portion. Further, a spring is included which loads the valve body. Furthermore, a reservoir is present which supplies the lubricating element with lubricant.

An advantage of this embodiment is that relubrication of the telescopic shaft, including profiled tubes, commonly used to drive agricultural implements or working machines, is not activated unless the profiled tubes are assembled and inserted into one another. As long as these components are not inserted into one another, no lubricant can emerge.

According to a further embodiment of the invention, it is possible to provide the guiding channel in the form of at least one groove arranged in the tappet. Alternatively, the guiding channel is in the form of a gap located between the outer face of the tappet and the wall of the valve bore.

In the case of the latter embodiment, when the inner profile moves relative to the outer profile in the sliding direction and/or in the circumferential direction within the range of play, a relative movement occurs between the bore and the tappet. This relative movement results in a pumping effect which allows small amounts of lubricant to emerge.

In one embodiment, the guiding channel is provided in the form of a groove. Preferably, the design is such that the circumferential play between the inner and outer profiled tubes is used to open the valve; to lift the valve body off its seat.

According to a further embodiment of the invention, the reservoir is in a housing portion. The reservoir comprises a storage chamber which opens towards the interior of the housing. The reservoir is associated with a piston loaded by a loading element, which, together, pressurize the lubricant contained in the storage chamber.

The force of the loading element for the piston is calculated such that, in an embodiment where there is play between the outer face of the tappet and the wall of the valve bore accommodating the tappet, the force is insufficient to eject lubricant although, due to the inner profiled tube with the lubricating device inserted into the outer profiled tube, the valve is actually open. If the circumferential play between the two profiles is used to open the valve, the force generated by the loading element and applied to the piston is such that in all those cases where torque occurs, a certain amount of lubricant can emerge. In a preferred embodiment, the loading element is a pressure spring. Furthermore, a filling valve is provided to fill the storage chamber with lubricant. Alternatively, the reservoir is in the form of a cartridge which is separate from the housing. The housing and cartridge include means to connect with one another. The cartridge is replaceable.

Furthermore, the invention relates to a telescopic shaft with a lubricating device where the valve tappet is guided through an aperture in the inner profiled tube. The valve tappet projects beyond the outer face of the inner profiled tube onto the inner face of the outer profiled tube. In a further embodiment, the inner profiled tube and the outer profiled tube comprise profiled portions to transmit torque. Here, the sliding face portions are separately active for each direction of rotation. One valve is provided per direction of rotation. The projecting portion of the tappets projecting beyond the outer face is dimensioned such that it assumes a size ranging between greater than zero and smaller than half the adjustment path resulting from the rotational play between the two profiled tubes. This dimension corresponds to the opening path of the tappet and that of the valve member, respectively.

From the following detailed description, taken in conjunction with the drawings and subjoined claims, other objects and advantages of the present invention will become apparent to those skilled in the art.

BRIEF DESCRIPTION OF THE DRAWINGS

Two preferred embodiments of the invention and their use in a driveshaft for driving, or for the drives of, agricultural implements and working machines are diagrammatically illustrated in the drawing wherein:

FIG. 2 is a cross-section view of a first embodiment lubricating device associated with a first embodiment of a telescopic shaft.

FIG. 3 is a cross-section view of FIG. 2 along line 3—3 thereof.

DETAILED DESCRIPTION OF THE DRAWINGS

Figure 1:
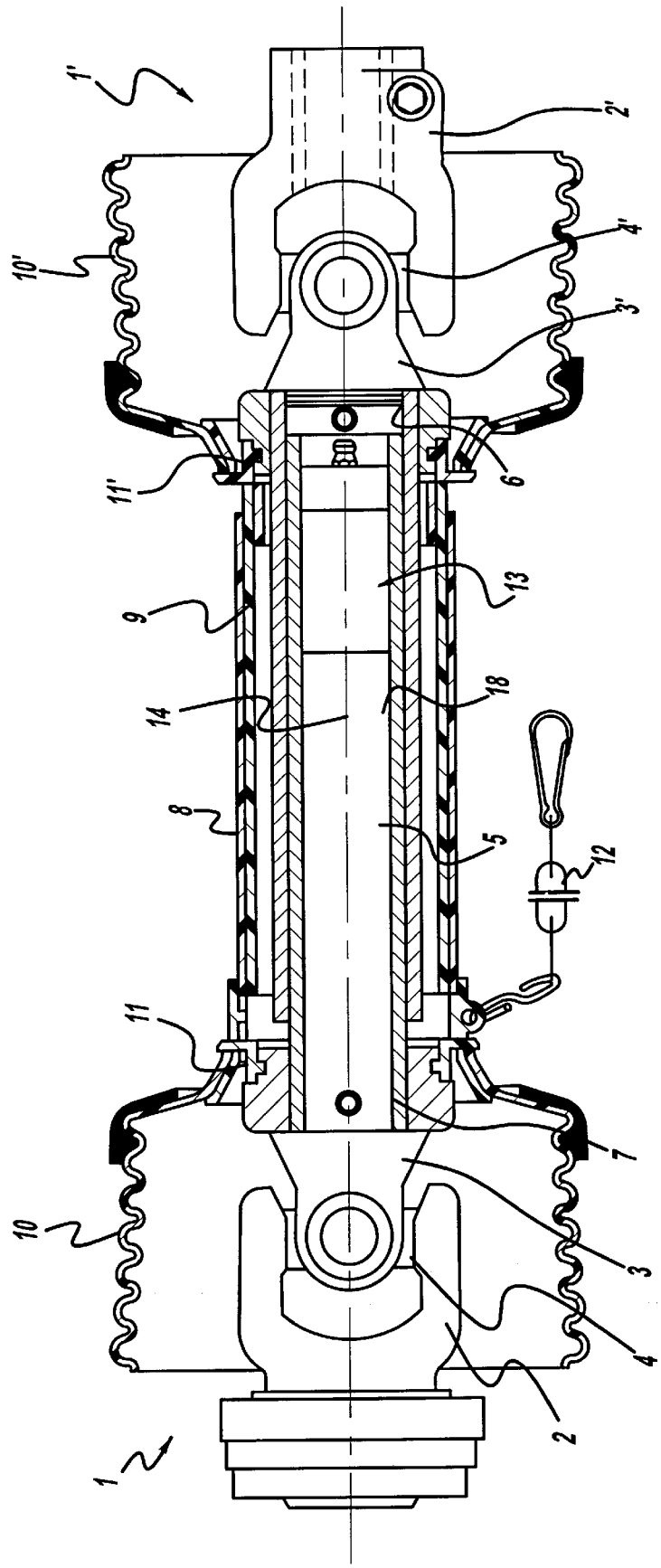
FIG. 1 is a longitudinal section view of an agricultural driveshaft with a lubricating device according to the invention.

FIG. 1 illustrates a driveshaft used for driving agricultural implements. Ordinarily, the driveshaft is between the power take-off shaft of a tractor and the input shaft of an implement. The driveshaft has two joints 1, 1'. The first joint yokes 2, 2' of the joints serve to be connected to a driving or driven shaft. The first joint yokes 2, 2' are each articulatably connected to a second joint yoke 3, 3' by a cross member 4, 4'. Thus, the joint yokes 2, 3; 2', 3', carry out articulation movements relative to one another in terms of space.

The two joints 1, 1' are connected to one another by a telescopic shaft 5. The shaft 5 comprises an outer profiled tube 6 and an inner profiled tube 7. In the embodiment illustrated, the outer profiled tube 6 is firmly connected to the second joint yoke 3' of the joint 1'. The inner profiled tube 7 is firmly connected to the second joint yoke 3 of the joint 1. The inner profiled tube 7 is inserted into the outer profiled tube 6. In a cross-sectional view, both profiled tubes are designed in such a way that torque can be transmitted around the longitudinal axis 14. Also, the tubes are slidable inside one another in the direction of the longitudinal axis 14 so that a change in distance can occur between the two joints 1, 1'.

In FIG. 1, the driveshaft is shown in the shortened position, i.e. the two profiled tubes 6, 7 are inserted into one another as far as possible. Furthermore, the driveshaft has a protective device. The protective device includes an outer protective tube 8 rotatably supported on the joint yoke 3' of the joint 1' by a bearing 11', and a protective cone 10' which at least partially covers the joint 1'. An inner protective tube 9 is inserted into the outer protective tube 8. The inner protective tube 9 is supported on the joint yoke 3 of the joint 1 by a bearing 11. Furthermore, a protective cone 10 is provided which at least partially covers the joint 1. The protective device is securable by a holding means 12 in the form of a chain connected to a fixed part of the implement. Thus, when the joints 1, 1' rotate together with the telescopic shaft 11, formed by the two profiled tubes 6, 7, the components associated with the protective device are stationary. This prevents the rotating parts from being touched by an operative.

A lubricating device 13 is inserted into a cavity 18 of the inner profile 7 from the free end of the inner profiled tube 7. The lubricating device is arranged towards the end of the cavity at the end facing the joint 1'. To transmit torque, the outer profiled tube 6 and the inner profiled tube 7 may be two-rib tubes. The two-rib tubes are provided with two diametrically arranged rib formations. The ribs engage one another thus permitting torque to be transmitted between the two tubes. Also, the tubes enable a longitudinal displacement of the two tubes relative to one another along the longitudinal axis 14. Further, the surface portions rest against one another in the region of the rib formations. Between the rib formations of the inner profiled tube 7 and the outer profiled tube 6 a functional play exists in the circumferential direction. An embodiment of the lubricating device for such profiled tubes with outwardly directed rib formations is explained in greater detail with reference to FIGS. 2 and 3.

Alternatively, a profiled tube may be used with two diametrically arranged formations which extend inwardly from the outer face of the otherwise round tube. The formations engage a groove which is also formed by an inwardly directed recess in the inner profiled tube. Here, defined flanks occur. An embodiment of a lubricating device, which is particularly suitable for such a design, will be explained with reference to FIGS. 4 and 5.

FIGS. 2 and 3 show a first embodiment of an inventive lubricating device 13 associated with a telescopic shaft. An outer profiled tube 6, which includes two outwardly directed profiled portions 19, engages the inner profiled tube 7 via a corresponding profiled portion 20. This enables torque to be transmitted between the two profiled tubes 6, 7. The engagement also enables the inner profiled tube 7 to be displaceable relative to the outer profiled tube 6 in the direction of the longitudinal axis 14.

The lubricating device 13 is inserted into the end of the inner profiled tube 7. In the region of its profiled portions 20, the inner profiled tube 7 has radially extending apertures 39, 39'. The apertures 39, 39' extend through the wall of the inner profiled tube 7. The apertures 39, 39' connect the inner profiled tube cavity 18, which contains the lubricating device 13, with the outer face of the inner profiled tube 7. Thus an opening which serves to supply lubricant from the lubricating device 13 exists opposite the inner face of the outer profiled tube 6 in the region of the formations 19. The surface portions 17, 17' sliding on the outer face of the inner profiled tube 7 are lubricated during operation.

The lubricating device 13 includes a lubricating element 15 and a reservoir 16. The lubricating element 15 includes a housing 25 with two valve bores 26, 26' offset at a distance from one another on the longitudinal axis 14. The bores 26, 26' are arranged transversely relative to the longitudinal axis 14. One valve bore 26 extends towards the surface portion 17'. The other valve bore 26' extends to the surface portion 17. Starting from the interior 29 of the housing 25, two valve tappets 22, 22' are inserted into the two valve bores 26, 26'. Each valve tappet 22, 22', towards the interior 31, carry a valve body 21, 21'. The two valve bodies 21, 21' each have a sealing effect relative to a seat face 27, 27'. The valve bodies 21, 21' are made to rest against the seat face 27, 27' via a spring 23, 23'. Each spring, on the one hand, is arranged in a bore of the valve body 21, 21' and, on the other hand, is guided on spring holding means 24, 24'. The spring holding means 24, 24' is in the form of a pin inserted into the wall of the housing 25 while projecting inwardly therefrom.

The tappets 22, 22' project beyond the outer face of the housing 25 onto the inner face of the profiled portion 19 of the outer profiled tube 6. The outer diameter of the tappet 22, 22' is smaller than the diameter of the valve bore 26, 26'. Thus, between the tappet and valve bore a guiding channel 28, 28' is formed. The guiding channel 28, 28' enables lubricant to emerge outwardly when the valve bodies 21, 21' are lifted off the seat 27, 27' towards the interior 29 of the housing 25. This is the case when the inner profiled tube 7, with the lubricating device 13, is inserted into the outer profiled tube 6. To facilitate the inserting operation, the end faces of the two tappets 22, 22' are rounded. Via the rounded regions, the two tappets project outwardly through the apertures 39, 39' in the inner profiled tube 7 beyond the tube's outer face.

A housing portion 30 with a cylindrical bore 33 is integrally formed onto the housing 25 of the lubricating element 15. The diameter of the bore 33 is greater than the passage between the storage chamber 31 and the interior 29 of the lubricating element 15. Thus, the resulting step limits the path of a piston 32. The piston 32 is guided in the bore 33 and loaded by a pressure spring 34 in the direction of the interior 29. The pressure spring 34 is supported against an abutment 34 by one or several pins. The pins are arranged transversely relative to the longitudinal axis 14. A filling valve 36 is provided at the end face of the housing 25, remote from the housing portion 30, of the lubricating element 15. The filling valve 36 serves to top off the supply of lubricant in the storage chamber 31.

Figure 5:
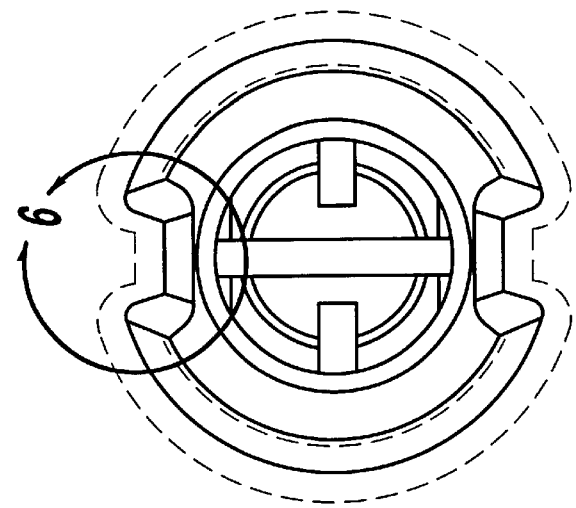
FIG. 5 is a cross-section view of FIG. 4 along line 5—5 thereof.
Figure 4:
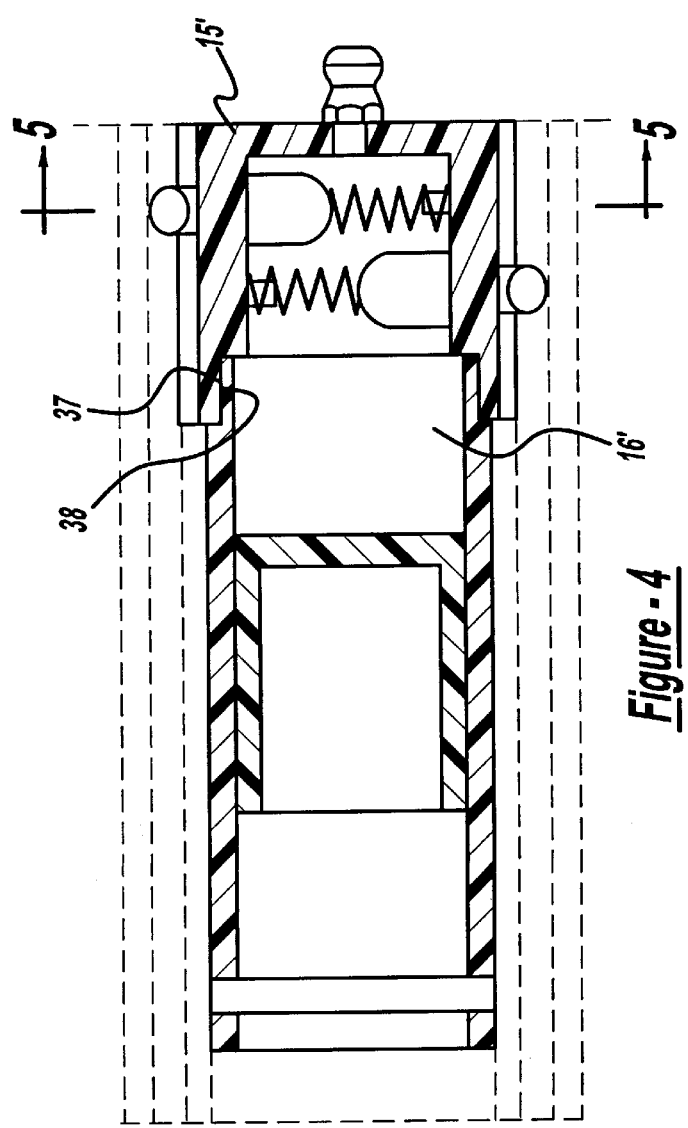
FIG. 4 is a cross-section view like FIG. 2 of a second embodiment of the present invention with the reservoir provided in the form of a cartridge and wherein there is provided a telescopic shaft whose profiled tubes comprise drawn-in profiled portions with two flanks for the transmission of torque, with one valve being provided per flank.
Figure 6:
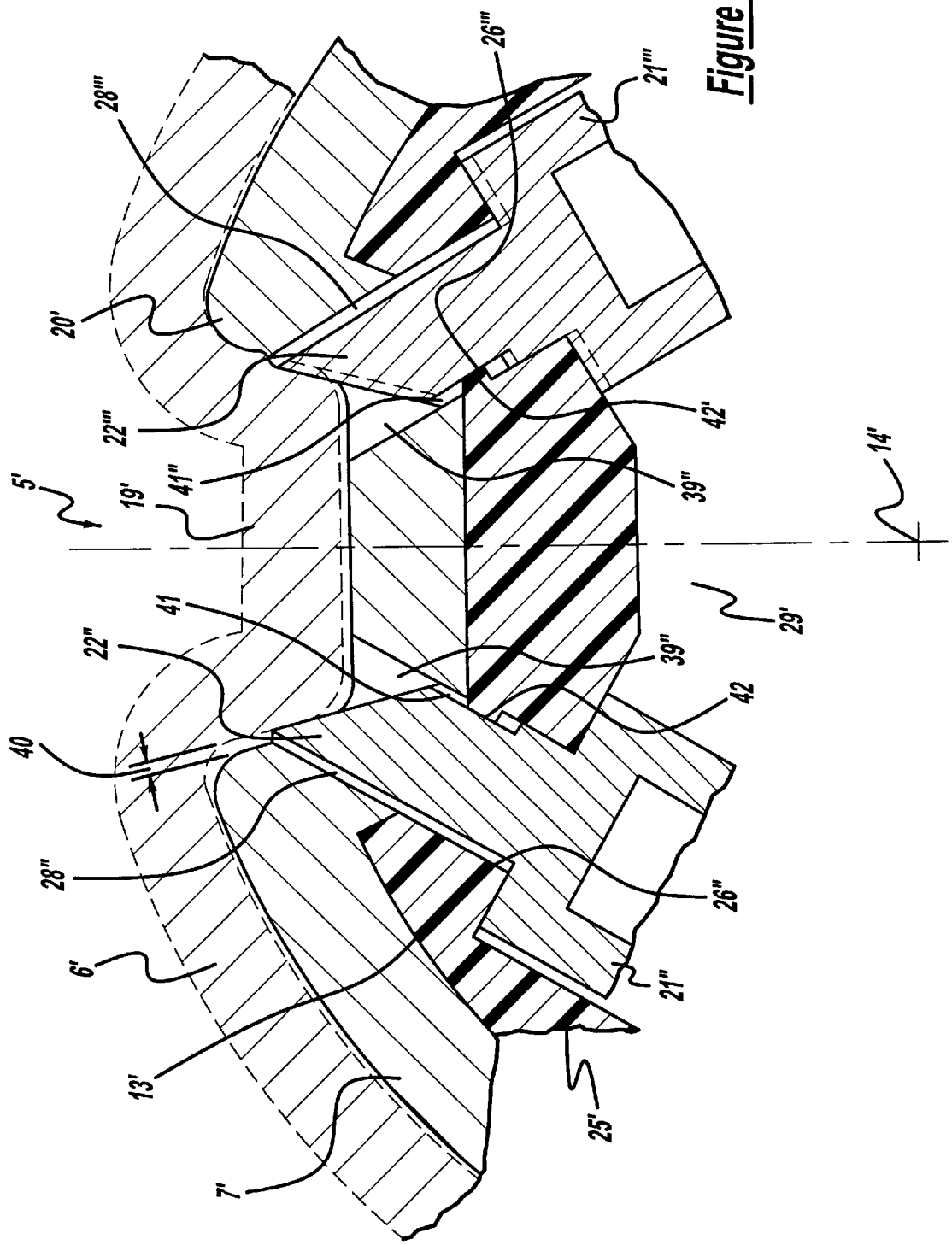
FIG. 6 is an enlarged view of FIG. 5 within Circle 6.

FIGS. 4 and 5 show a second embodiment of a lubricating device 13' used in a further embodiment of a telescopic shaft 5'. The shaft 5' has an outer profiled tube 6' and an inner profiled tube 7'. The tubes include profiled portions 19', 20' in the form of recesses extending inwardly towards the longitudinal axis 14'. The recesses form flanks. The flanks, during the transmission of torque, and depending on the direction of rotation, contact one another. Depending on the direction of rotation, only one pair of flanks per profiled portion 19', 20' (only one of which is shown in FIG. 5) establishes contact. The lubricating element 15' is provided with one valve each for lubricating a pair of flanks. The housing 25' of the lubricating element 15' is adapted to the inner contour of the inner profiled tube 7'.

In the region towards the flanks, per recess, two apertures 39", 39'" are provided in the inner profiled tube 7'. Tappets 22", 22'", each carrying a valve body 21", 21'" are guided through the apertures 39", 39'". The tappets 22", 22'", towards the valve bores 26", 26'" receiving the tappets 22", 22'", include grooves in the form of guiding channels 28", 28'". The guiding channels 28", 28'" extend along the axis of displacement of the tappets and reach as far as the valve bodies 21", 21'".

The end faces of the two tappets 22", 22'" are adapted to the shape of the flanks of the profiled portion 20' of the inner profiled tube 7'. The resulting inclination requires the tappets 22", 22'", together with the valve bodies 21", 21'", to be non-rotatably held. This is the reason why, in the region of the valve bores 26", 26'", one projection 42, 42' is provided which engages a groove 41, 41'. The groove 41, 41' also extend parallel to the axis of displacement of the tappets 22", 22'".

In the stationary condition of the telescopic shaft 5', when no torque is transmitted, play occurs between the two profiled portions 19', 20' of the outer profiled tube 6' and the inner profiled tube 7'. The play is effective in the circumferential direction. In the stationary condition, the tappets 22", 22'", via their end faces, in the form of projecting portions 40, project beyond the respective flanks of the profiled portion 20' of the inner profiled tube 7' towards the opposed flanks of the profiled portion 19' of the outer profiled tube 6'. The two valve bodies 21", 21'" are positioned on the seat faces. Thus, both valves are closed and lubricant cannot be ejected outwardly from the interior 29' of the housing 25' of the lubricating element of the lubricating device 13'.

If torque is applied in one direction of rotation, for example clockwise starting from the outer profiled tube 6' to the inner profiled tube 7', the tappet 22'" is loaded until the two flanks of the profiled portions 19', 20' closely rest against one another. The tappet 22'" is displaced inwardly by the projecting portion 40 of the valve body 21'". The valve body 21'" lifts off the valve seat. Thus, a connection is established between the interior 29', through the guiding channel 28'", and the outside surface portion between the two profiled portions 19', 20'.

The lubricant is conveyed outwardly through the connection as a result of the application of pressure. The further valve of the unloaded flanks, which valve is associated with the tappet 22" and the valve body 21", remains closed. Thus, lubricant is not supplied to this region where there is no friction movement between either of the two profiled tubes 6', 7', in the case of a longitudinal displacement. The advantage of this measure is that only those regions are supplied with a specific amount of grease or lubricant where a movement occurs and where torque is transmitted.

In the embodiment according to FIGS. 4 and 5, a reservoir 16' is provided in the form of a separate cartridge. The cartridge has an outer thread 38, which is sealingly received in an inner thread 37 in a projection of the housing 25' of the lubricating element 15'. Both threads 37, 38, together, form the connecting means. When the supply of lubricant is used up, the cartridge can be replaced.

While the above detailed description describes the preferred embodiment of the present invention, the invention is susceptible to modification, variation and alteration without deviating from the scope and fair meaning of the subjoined claims.

What is claimed is:

1. A lubricating device for lubricating at least one sliding face portion of a telescopic shaft having an inner and an outer profiled tube which are inserted into one another, the tubes transmit torque and are displaceable relative to one another along a longitudinal axis and a lubricating element associated with the inner profiled tube passing lubricant through the lubricating element to a sliding face portion of the tubes to be lubricated, the lubricating element comprising:

a housing;

at least one lubricating valve provided with a tappet, said tappet enabled to contact the sliding face portion of the outer profiled tube, and said tappet projecting out of the housing through a valve bore;

a valve body associated with the tappet, said valve body sealingly contacting a seat of the housing;

a guiding channel, through which lubricant can be moved to the sliding face portion;

a spring for loading the valve body; and a reservoir for supplying the lubricating element with lubricant.

2. A lubricating device according to claim 1, wherein said guiding channel is a gap between the outer face of the tappet and the wall of the valve bore.

3. A lubricating device according to claim 1, wherein the guiding channel being at least one groove formed in the tappet.

4. A lubricating device according to claim 1, wherein the reservoir is a housing portion associated with the housing and comprising a storage chamber which opens towards the interior of the housing and a piston associated with the reservoir loaded by a loading element which, together, pressurize lubricant contained in the storage chamber.

5. A lubricating device according to claim 4, wherein the loading element being a pressure spring which loads the piston.

6. A lubricating device according to claim 4, wherein a filling valve is coupled with the housing for filling the storage chamber with the lubricant.

7. A lubricating device according to claim 1, wherein the reservoir being a cartridge separated from the housing and said housing and cartridge including connecting means for establishing a connection.

* * * * *